United States Patent
Bentall et al.

(10) Patent No.: US 6,230,297 B1
(45) Date of Patent: May 8, 2001

(54) CELL BASED DATA TRANSMISSION METHOD

(75) Inventors: Mark Bentall, Gwent; Brian Charles Hargrave Turton, South Glam, both of (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/865,758

(22) Filed: May 30, 1997

(30) Foreign Application Priority Data

May 31, 1996 (GB) ................................... 9611372

(51) Int. Cl.[7] ................................................. H03M 13/29
(52) U.S. Cl. ............................................ 714/758; 714/776
(58) Field of Search .............................. 371/37.07, 37.02, 371/37.7; 714/758, 776, 781

(56) References Cited

U.S. PATENT DOCUMENTS

| | | | |
|---|---|---|---|
| 5,375,121 | * 12/1994 | Nishino et al. | 370/94.2 |
| 5,383,203 | 1/1995 | Miyazono | 371/37.1 |
| 5,471,503 | * 11/1995 | Altmaier et al. | 375/202 |
| 5,524,116 | * 6/1996 | Kalmanek, Jr. et al. | 371/48 |
| 5,535,221 | * 7/1996 | Hijikata et al. | 371/5.5 |
| 5,544,161 | * 8/1996 | Bigham et al. | 370/58.1 |
| 5,606,553 | * 2/1997 | Daniel et al. | 370/395 |
| 5,648,969 | * 7/1997 | Pasternak et al. | 370/349 |
| 5,699,369 | * 12/1997 | Guha | 371/41 |
| 5,710,756 | * 1/1998 | Pasternak et al. | 370/216 |
| 5,717,689 | * 2/1998 | Ayanoglu | 370/349 |
| 5,751,702 | * 5/1998 | Evans et al. | 370/314 |
| 5,757,783 | * 5/1998 | Eng et al. | 370/315 |
| 5,777,986 | * 7/1998 | Grossman | 370/235 |

FOREIGN PATENT DOCUMENTS

| | | |
|---|---|---|
| 0 445 730 A2 | 3/1991 | (EP) . |
| 0 516 042 A2 | 5/1992 | (EP) . |
| 0 600 380 A2 | 11/1993 | (EP) . |
| 2 216 752 | 2/1989 | (GB) . |
| WO95/14971 A1 | 6/1995 | (WO) . |

OTHER PUBLICATIONS

"A Strategy for Designing Error Detection Schemes for General Data Networks", Jane M Simmons, IEEE Network, Jul./Aug. 1994, pp. 41–48.

"Design of Error Detection Scheme for Class C Service in ATM", Jane M Simmons and Robert G Gallager, IEEE/ACM Transactions on Networking, vol. 2, No. 1, Feb. 1994, pp. 80–88.

Armitage et al., "Packet Reassembly During Cell Loss", IEEE Network, Sep. 1993, pp. 26–34.*

Petr et al., "Delay Performance of Segmentation Options for Mixed Packet Networks", Southeastcon '94, pp. 84–88, Dec. 1994.*

Moore et al., "Variable Rate Error Control for Wireless ATM Networks", ICC '95, pp. 988–992, Jun. 1995.*

Yajnik et al., "Adaptive Coding for Packetized Data in Wireless Networks", PIMRC '95, pp. 338–342, Dec. 1995.*

Agrawal et al., "SWAN: A Mobile Multimedia Wireless Network", IEEE Personal Communications, Apr. 1996, pp. 18–33.

Chiani et al., "Hybrid ARQ/FEC Techniques for Wireless ATM Local Area Networks", PIMRC '96, pp. 898–902, Oct. 1996.

* cited by examiner

*Primary Examiner*—Stephen M. Baker
(74) *Attorney, Agent, or Firm*—John D. Crane

(57) ABSTRACT

In a cell-based transmission protocol such as ATM, a Cyclic Redundancy Check code is used for error detection at a frame level, and a Hamming code is used for error correction at the cell level, to improve error protection, and reduce the need for retransmission. The method can be used as a modification to ATM Adaption Layers.

14 Claims, 6 Drawing Sheets

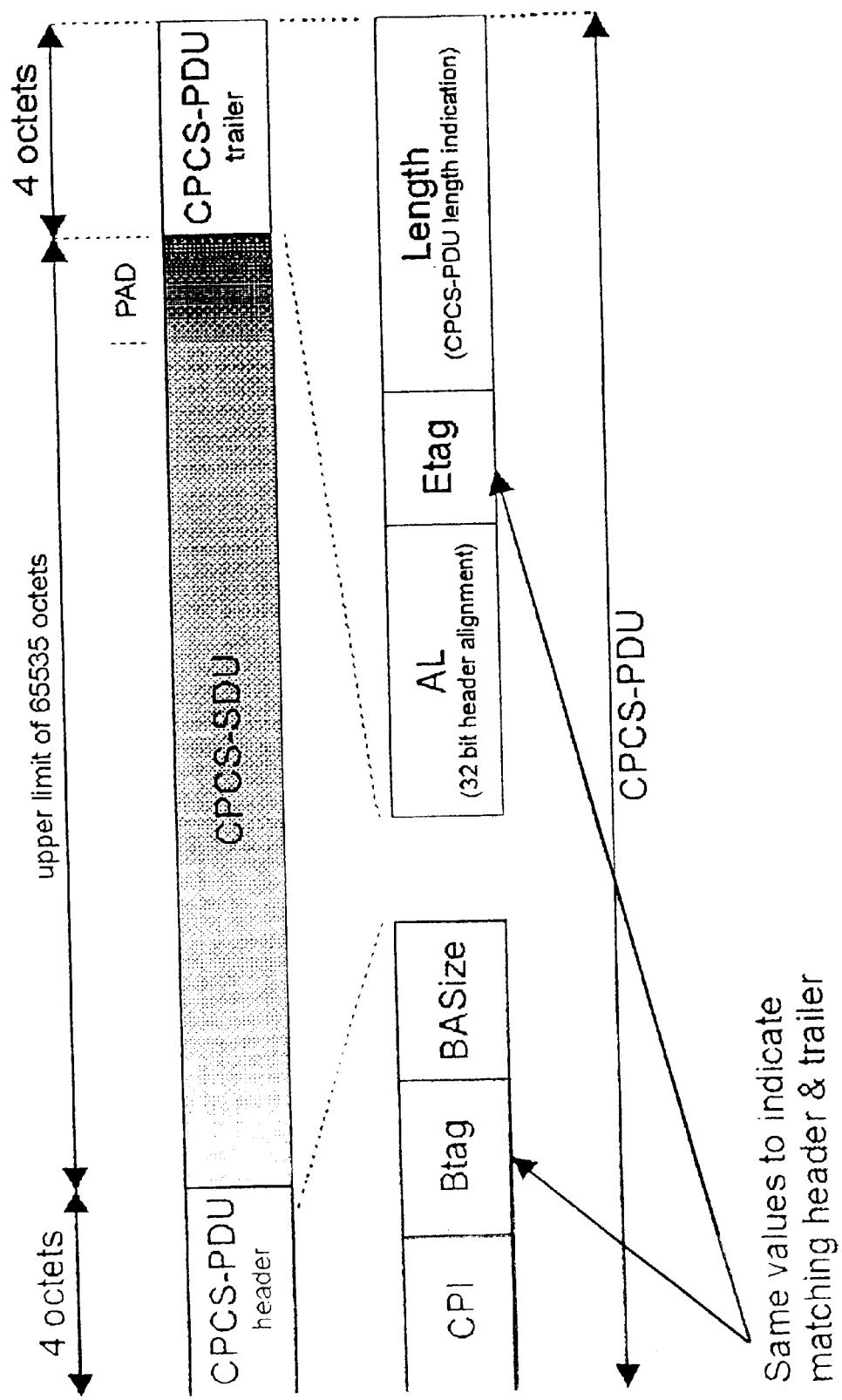
Figure 1    Prior Art Frame

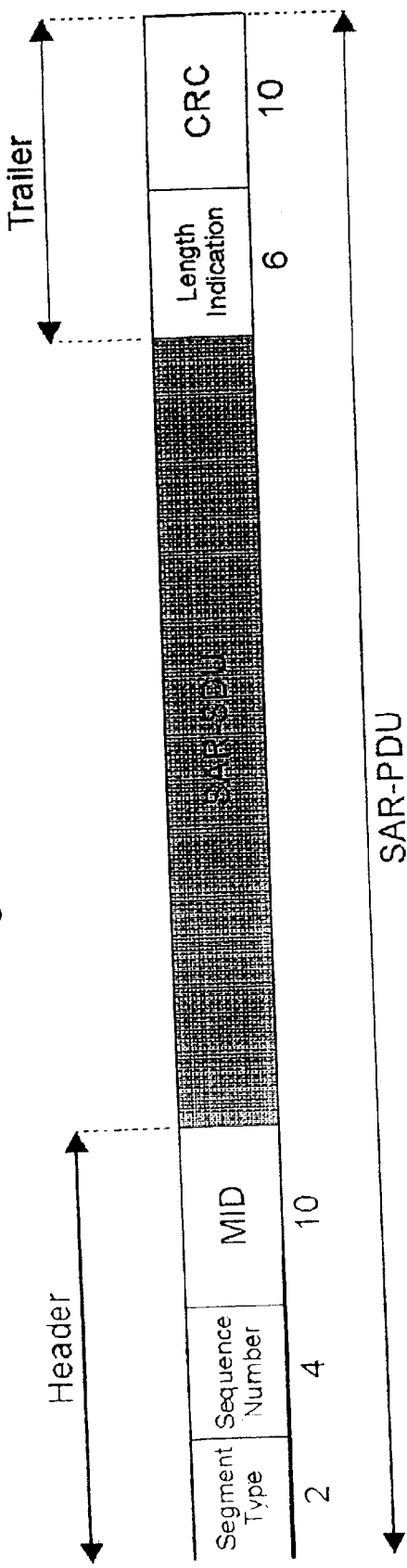
Figure 2    Prior Art Cell
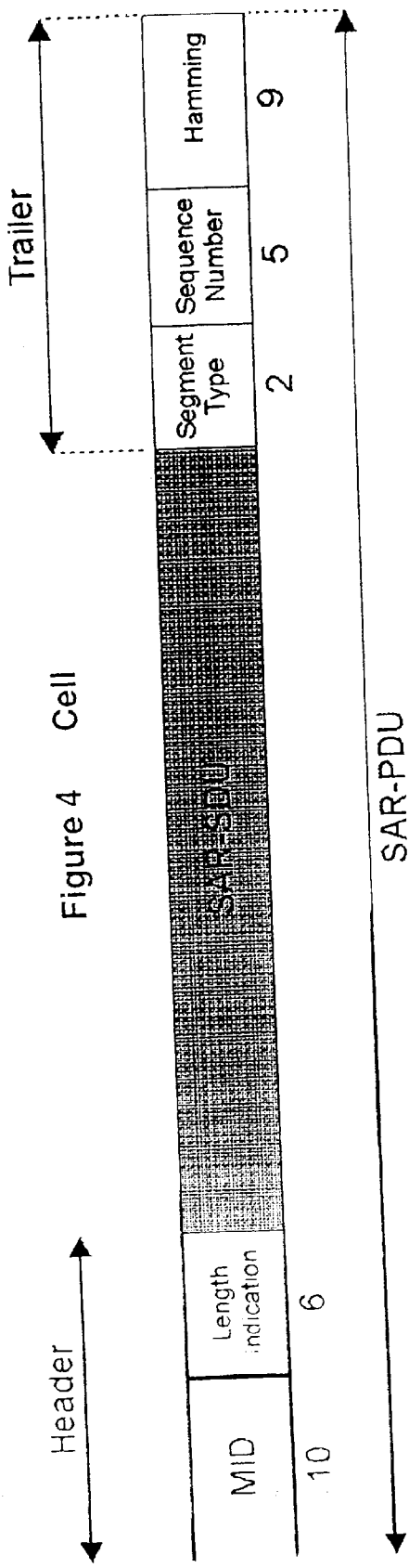
Figure 4    Cell

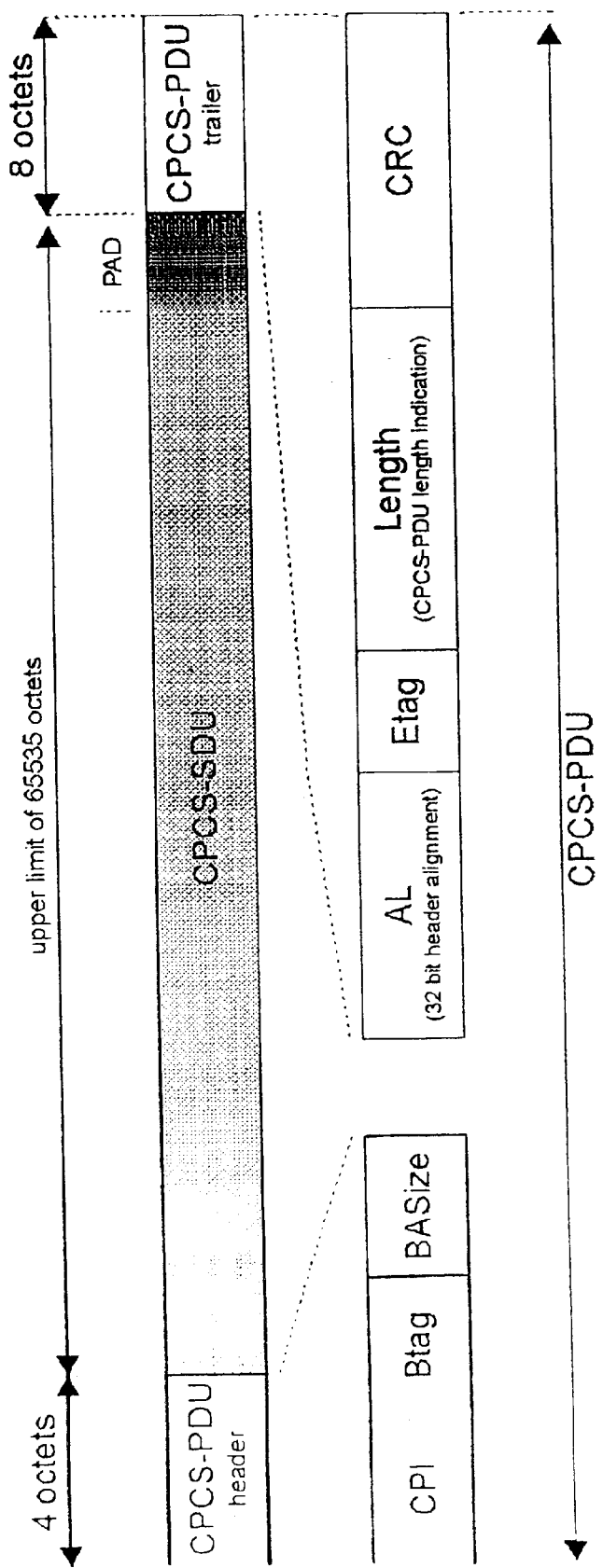
Figure 3 Frame

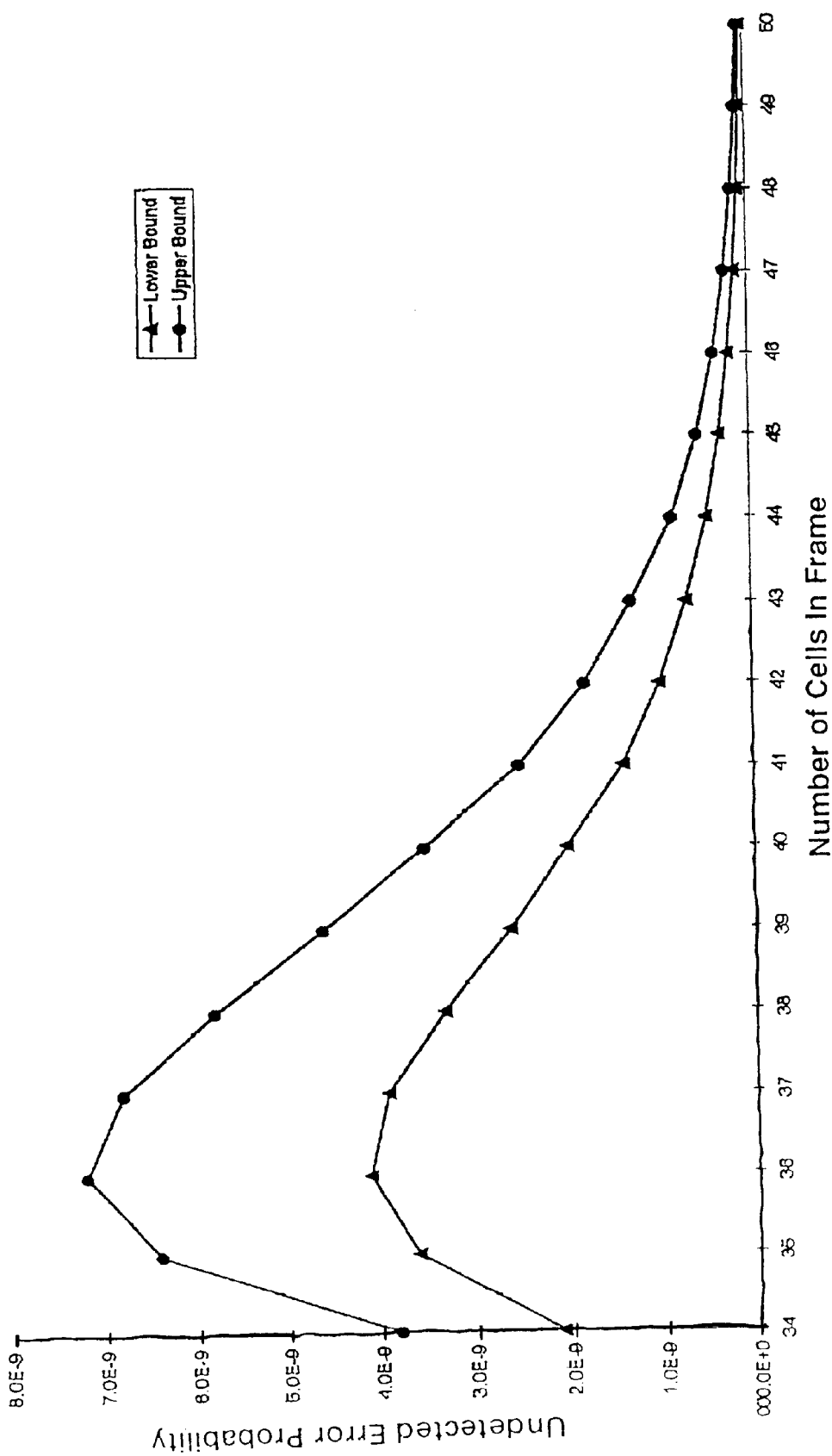
Figure 5 Prior Art: Undetected Error Probability due to Rerouting with 4 bit sequence number

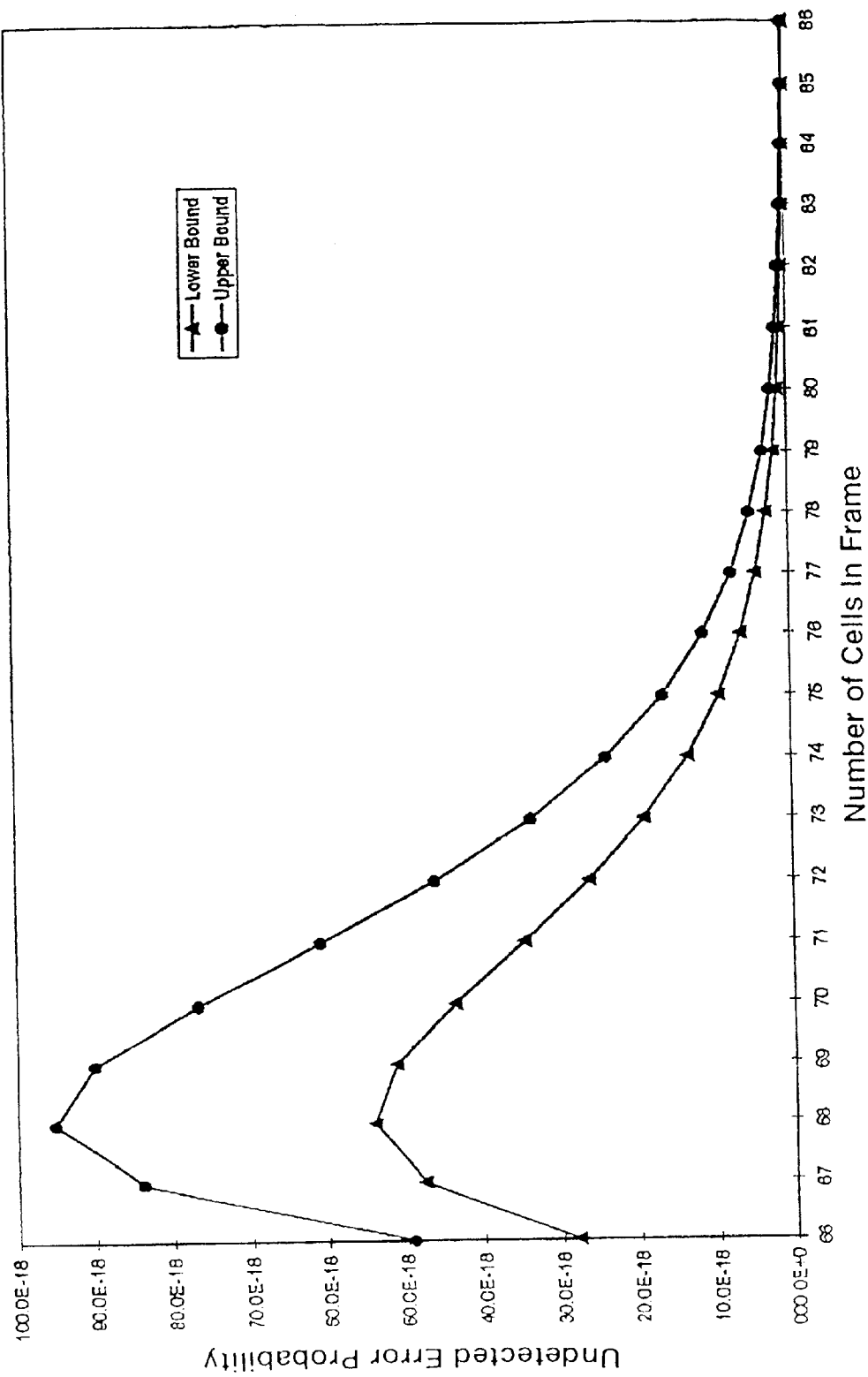
Figure 6  Undetected Error Probability due to Rerouting with 5 bit sequence number

CELL BASED DATA TRANSMISSION METHOD

FIELD OF THE INVENTION

This invention relates to methods of transmitting data, cell-based methods of transmitting data, and to corresponding systems, apparatus and software for transmitting or receiving data.

BACKGROUND TO THE INVENTION

Cell-based protocols for transmission systems are well known. Cells are sent individually, and routed over a network using addressing information in the cell. Usually the data need to be fitted into a number of such cells. Some protocols specify variable length cells. Some are connection oriented such as S.N.A., A.T.M., X-25 and frame relay. Others are connectionless, for example IP. Such known protocols can be seen to have a layered structure with overhead for different functions being added at successively lower layers, at a transmitting end. At a receiving end, the overhead is successively stripped out once its function has been achieved. One type of overhead is error protection information. Generally, it has been considered worthwhile to include error detection bits at some layer, and a mechanism at a higher layer to request retransmission of some part of the data if the data are sensitive to errors.

Error correction codes such as Hamming codes are also known. These enable most but not all errors to be detected and corrected. Error correction codes are typically used in applications such as data storage on hard disks. When data are stored, error correction is generated and stored along with the data. On retrieval of data from the disk, the error correction information can be used to detect and correct errors.

Such techniques are not used in cell based protocols because the large overhead which would be required is considered to be prohibitive, particularly for larger cells, and because error correction codes are relatively poor at detecting some types of errors. Therefore, to ensure that the number of undetected errors is minimised, error detection codes such as Cyclic Redundancy Check (CRC) codes or Reed-Solomon codes are used, together with retransmission of cells or groups of cells. One such known protocol, the ATM protocol will now be discussed in more detail.

The ATM protocol is an example of a cell-based protocol designed for data transfer over high speed, low error rate digital networks for multiple service types. ATM Adaptation Layers (AALs) shape the service data for the ATM protocol and provide error protection characteristics dictated by the properties of the transmission medium and the service. The data units entering the AAL have to be protected to satisfy the ITU-T's assured and unassured service recommendations. This error protection is achieved by concatenating each data unit with a header and trailer resulting in a variable length frame structure. The frame is then segmented into cells for transmission by the ATM protocol which in turn may have further protection.

The ATM protocol is characterised by the cells being of fixed length, and by its support for circuit emulation. ATM cells have headers with routing information and with header error correction information. There are currently a number of different AALs specified, each with different error handling features. For example AAL 5 includes error detection information, though not correction information at the frame level, but none is provided at the cell level, at least for the cell payload.

The ITU-T has recommended that erroneous frames be recovered by retransmissions of the entire frame in preference to individual cell retransmissions. Assured services carry significant disadvantages because of the retransmission system, including:

prolonged buffering at the transmitter, (i.e. at an access node where the ATM network is entered)

prolonged buffering at the receiver, complex protocol acknowledgement structures and increased latency from acknowledgement messages and data retransmission.

Protocols have been developed to provide selective cell retransmissions, for example BLINKBLT, although they cannot offer serious reductions in the service latency or buffering requirements. For these reasons the ITU-T is proposing to restrain assured services to point-to-point connections.

There is a selection of applications that requires low, though not perfect, error performance. The inventors have established that the overall error rate is limited by uncontrollable errors. Furthermore, any retransmissions penalise the application causing it to buffer data for prolonged periods. Many applications would benefit from bufferless transmission provided the error rates are sufficiently low, especially where equipment cost is an important factor.

GB 2216752 shows transmitting a block of data spread over a number of packets with additional redundant information for error correction being added to the block before transmission (forward error correction at the block level). The correction in the receiver can be carried out if sufficient correct packets are received. An automatic repeat request mechanism (ARQ) is used at the packet level if insufficient correct packets are received. In an alternative embodiment, the ARQ is carried out as soon as a packet is detected as being erroneous rather than waiting to see if sufficient packets from a block are received.

Various schemes including cell header correction without payload error correction are shown in EP 0516042, EP 0600380, EP 0445730, and U.S. Pat. No. 5,383,203. WO 95/14971 shows error detection based on redundant information spread over a number of frames or cells. Error detection triggers resynchronisation of transmitter and receiver encoding/decoding methods.

The present invention aims to improve on the known methods.

SUMMARY OF THE INVENTION

According to one aspect of the invention, there is provided a method of transmitting data comprising the steps of:

supplementing the data with error detection information;

forming the supplemented data into at least one cell, the cell comprising cell routing information and a cell payload and wherein the cell payload comprises at least a portion of the supplemented data and error correction information for the portion; transmitting the cell to a destination;

correcting an error in the cell using said error correction information;

extracting the portion of the supplemented data from the cell;

and detecting uncorrected errors in the data using said error detection information and reporting the uncorrected errors to an error processing means.

By performing error correction at lower level than the error detection, the amount of overhead required can be reduced, and/or a reduction in retransmissions can be achieved. This enables buffering at the access nodes to be reduced. In turn this can reduce the cost of access node hardware. The buffering hardware often makes up a significant proportion of the cost of an access node. The reduction in retransmission will also reduce congestion and delays in transmission.

Offering low-level error correction, possibly combined with higher-level error detection, allows frame-based transmission circuits requiring high integrity but tolerant of very rare discarded packets to operate without the need for buffering for retransmission at the transmitter. The control of such buffers is often difficult and costly in memory and processing power and its removal provides a useful advantage.

The main advantages are: 1. reduced retransmissions, or 2. reduced buffering and acceptance of the occasional loss. In the second case, the loss is much less than without this technique.

According to another aspect of the invention, there is provided a cell-based method of transmitting data comprising the steps of: dividing the data across two or more of the cells; transmitting the cells to a destination; performing error detection and correction on the divided data in each cell individually; recombining the corrected divided data; and detecting uncorrected errors in the recombined data.

According to another aspect of the invention, there is provided a method of transmitting data comprising the steps of: forming the data into at least one frame, the frame also comprising error detection information relating to the data in that frame, sufficient to achieve an undetected bit error rate of substantially $10^{-21}$; forming each frame into at least one cell, the cell comprising cell routing information and a cell payload, the payload comprising at least a portion of the frame; transmitting the cell to a destination; extracting the frame from the cell; and detecting errors in the frame from the error detection information for that frame, and reporting them to an error processing means.

This enables the number of undetected errors in a frame to be negligible, without an unnecessary increase in the overhead at the cell or frame level.

Another aspect of the invention provides a system comprising means arranged to carry out such steps.

Other aspects of the invention provide apparatus for a transmitting side or a receiving side of the system, or software stored on a computer readable medium for carrying out the steps of: receiving data transmitted in a cell-based form, the data being divided across two or more of the cells; performing error detection and correction on the divided data in each cell individually; recombining the corrected divided data; and detecting uncorrected errors in the recombined data.

If the error detection information is added as part of a framing process, then errors can be detected on a frame by frame basis. Thus retransmission can be requested of only those frames with errors, if desired.

Advantageously the error correction information may comprise a Hamming code. This is a particularly efficient and easy to implement form of error correction code.

Advantageously the error detection information may comprise a CRC code. Again this code is particularly efficient and easy to implement.

Advantageously the cell transmission is by a connection oriented method. This implies an end to end connection is established before data is transmitted, and the connection is released after transmission. Advantages include the fact that sequence integrity is normally maintained, and that incremental processing to transfer data once the connection is established, is reduced.

Advantageously, before transmission, a desired bandwidth request, or tolerable maximum error rate request or other quality of service request for the transmission is sent to the link. This enables resources such as bandwidth, and error processing hardware to be allocated more efficiently.

Advantageously the error processing means is operable to request retransmission of some or all of the data if an uncorrected error is detected. Thus applications which are sensitive to data errors can be assured of any level of error rate, even down to $10^{-21}$ as desired.

Advantageously the cell transmission is carried out by an ATM protocol. This protocol can handle a wide range of types of data having different bandwidth, delay and error limitations. The short size of ATM cells (53 octets) means that error correction is relatively efficient, because the probability of uncorrectable two bit errors in a single cell reduces as the cell size is reduced.

Advantageously the frames are suitable for use with an ATM adaption layer. Such layers are suitable for adapting long variable length payloads into short fixed length ATM cells, or for adapting constant bit rate payloads into a sufficient rate of ATM cells. An intermediate step in these protocols involves forming variable length frames, to facilitate buffer allocation, multiplexing, timing, selective retransmission, and protection against cell loss.

Advantageously the CRC code is 37 or 38 bits long. This length enables the undetected error rate to reach substantially $10^{-21}$, which can be regarded as negligible. Clearly the code length can be varied somewhat without losing the advantage.

Advantageously the Hamming code is 9 bits long. This enables all one bit errors in a cell of up to 512 bits in length, to be corrected. An ATM cell is 384 bits in length, not including the header, which has its own error protection.

Advantageously a sequence number of 5 bits or more is included in each cell. This gives an appreciable decrease in the probability of an undetected error caused by loss of sequence owing to cell rerouting, over that achieved by a 4 bit sequence number, as is normally used in an ATM cell, created by AAL ¾ for example.

Advantageous features may be combined together and with any of the aspects of the invention, as would be apparent to a skilled person.

BRIEF DESCRIPTION OF THE DRAWINGS

To show by way of example how the invention may be put into effect, embodiments of the invention will now be described with reference to the accompanying drawings, in which:

FIG. 1 shows a known AAL ¾ frame structure for a common part convergence sub-layer (CPCS) protocol data unit (PDU);

FIG. 2 shows a known AAL ¾ cell structure for a segmentation and reassembly (SAR) PDU;

FIG. 3 shows the frame structure of FIG. 1, modified according to an embodiment of the invention;

FIG. 4 shows the cell structure of FIG. 2 modified according to an embodiment of the invention;

FIG. 5 shows undetected error probability owing to cell rerouting for a conventional 4 bit cell sequence number; and FIG. 6 shows undetected error probability owing to cell rerouting for a 5 bit cell sequence number according to an embodiment of the invention;

DETAILED DESCRIPTION

Figure 7:
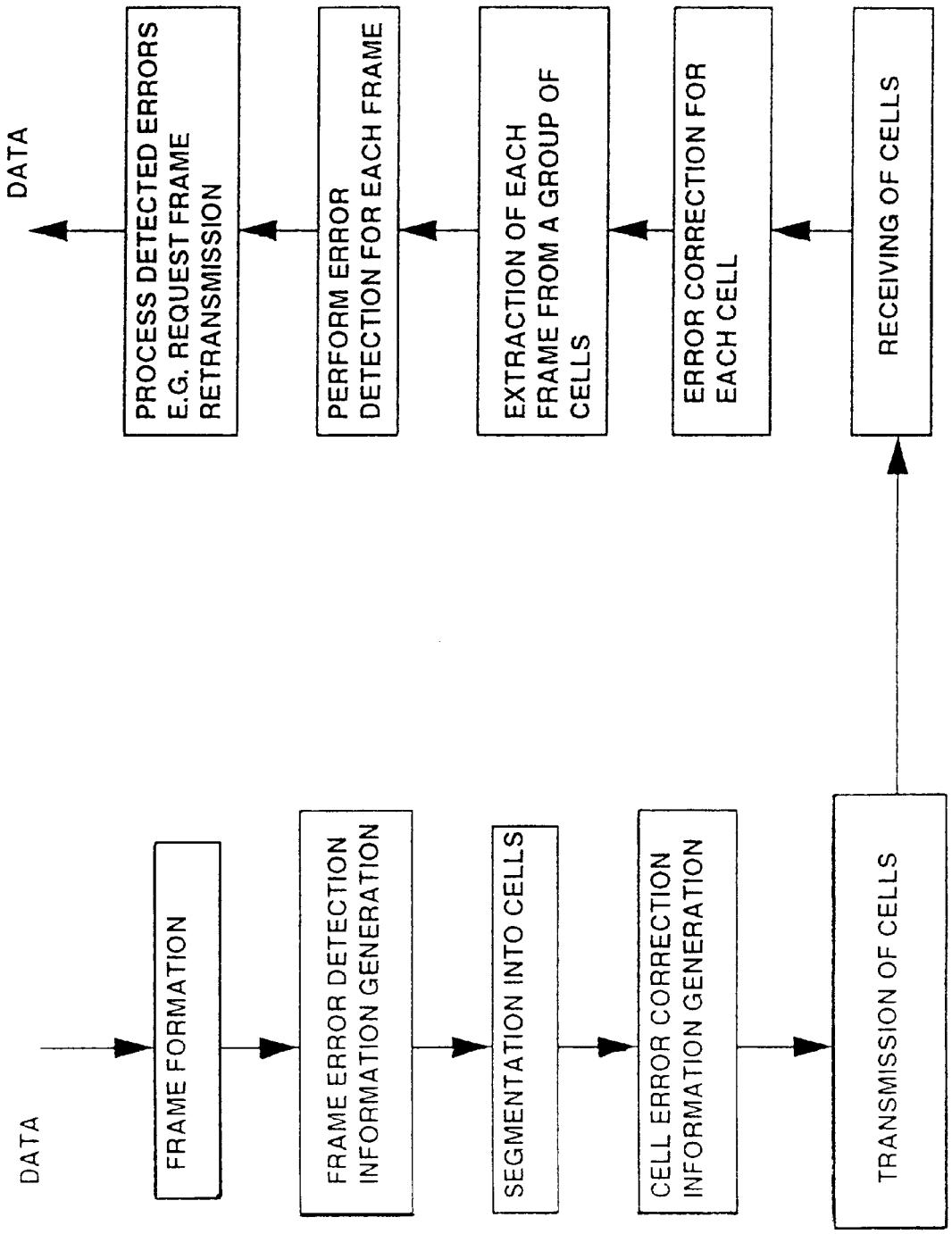
FIG. 7 shows an embodiment of the data transmission method of the invention in schematic form.

The inventors have analysed error performance issues involved in optical ATM networks to demonstrate mathematically that the current AALs can be improved with a minimum of alteration to the protocol structure. The invention enables unassured service recommendations to achieve sufficiently high error correction and detection rates that will allow many applications to ignore erroneous data and therefore eliminate buffering.

The underlying characteristics of ATM network error performance metrics will now be discussed. The metrics are used to determine the suitability of Forward Error Checking (FEC) codes and the amount of protection they are required to provide. Perfect error detection schemes cannot be achieved although it is possible to propose an acceptable value to provide an upper limit. A value of $10^{-21}$ was proposed and accepted by ANSI X3T9.5 for the MAC protocol of FDDI. This is approximately equal to allowing no more than one undetected error within 100 years on a 10Tbit/s link. This definition is used as the basic reference value or threshold herein.

Network Error Performance Metrics

Several error types have to be considered to ensure maximum protection against undetected errors. In Simmons J M.: "A Strategy for Designing Error Detection Schemes for General Data Networks", IEEE Network, pgs 41–48, July/August 1994, all error types were sectioned into the OSI 7-layer reference model. The lowest layer of the B-ISDN model is SONET or SDH, and does not provide any error checking for the payload, allowing all errors to appear at the ATM layer. The ATM layer does not perform any error checking on the payload and is also transparent to errors. It is the function of the AAL to detect errors within itself and errors caused by the lower two layers.

The error types considered are independent random bit errors, burst errors, cell loss, misdirected cells and misordered cells. The probability of each is denoted by $P_1$, $P_B$, $P_C$, $P_{MD}$ and $P_{MO}$ respectively. The units for each probability are dependant on the form of measurement and will be discussed individually.

Independent Bit Errors:

Many papers concerned with error performance, consider the independent random bit error rate on a point-to-point fibre optic link. The values determined vary between $10^{-8}$ and $10^{-10}$, and so the worst case of $P_1=10^{-8}$ per bit or $P_1=4\times10^{-6}$ per cell, will be assumed for the present purposes.

Burst Errors:

In Simmons et al: "Design of Error Detection Scheme for Class C Service in ATM", IEEE/ACM Transactions on Networking, Vol.2 No.1 Feb 1994, burst errors are evaluated from a study of a fibre optic system showing the most probable cause of burst errors arises from protection switching. An estimate for burst error probability based on this study gives $P_B=9\times10^{-8}$ per cell.

Cell Loss:

ATM switches discard cells in a two level priority scheme without notification if congestion occurs or the user-network agreed bandwidth is exceeded. Other forms of cell loss arise from burst and bit errors although congestion is the contributing factor. Simmons et al states that a study shows how cell loss should be designed not to exceed $10^{-6}$. Therefore $P_C$ is taken as $10^{-6}$ per cell, though this is not an acceptable limit.

Misdirected Cells:

The ATM layer relays the next hop address in the Virtual Path Identifier (VPI) and Virtual Channel Identifier (VCI) fields, held within the 5 octet cell header and protected by a Header Error Check (HEC). The HEC works in a two stage correction/detection mode using an 8 bit Hamming CRC. Simmons et al show that the probability of the cell being misdirected is bound by the probability of burst errors occurring on the entire header giving $P_{MD}=3\times10^{-10}$. Although Simmons et al suggest an intuitive method to reduce $P_{MD}$ 100-fold by using a 4 state correction/detection algorithm; for the present purposes the worst case of $3\times10^{-10}$ is assumed.

Misordered Cells:

ATM retains cell sequence integrity throughout the network so random misordered cells are unlikely to occur. The misordering of cells may be caused by dynamic re-routing and since ATM is a connection-oriented technology, re-routing should only take place when driven by a resource failure or repair. A resource failure will cause protection switching to occur, as described in Simmons et al, and a burst error will be experienced. The burst period, on average 30 ms long, and the route alteration from the optimal to a backup route will not cause misordering. Resource repair re-establishes the optimal connection, i.e. the least cost connection where the cost function is likely to incorporate the shortest route. It can be seen that the optimal route re-establishment will cause cell misordering of various lengths depending on the latency difference between the optimal and backup routes.

The probability of misordering, $P_{MO}$, in an ATM network is assumed to be equal to the probability of link restoration. It is assumed that for every connection failure there will be connection restoration without disruption to the service so $P_{MO}$ is also equal to the probability of a resource failure. The probability of a resource failure can be sub divided into link failures, switch hardware failures and software failures. For the present purposes only switch hardware failures could be obtained which gave a worst case MTBF as hard disc failures of duration 5 years. Although this does not reflect the total failure probability it is used to demonstrate the protocol's efficiency. The error performance of the protocol will therefore be presented by the worst case error rate that can be experienced by the protocol within the 100 year period. Since the worst case MTBF is 5 years then 20 failures will probably be experienced within the 100 year period, therefore $P_{MO}=20$ per switch. AAL ¾ has the most developed error handling capabilities of all the AALs, and so will be discussed in more detail here, though the invention is not limited to this example, and is clearly applicable to other AALs.

AAL ¾ Error Detection Performance

To protect against bit errors, AAL ¾ implements an error detection CRC within the trailer of the cell that covers the 44 octet payload, header and trailer, see FIG. 1. The CRC is used for error detection only and its Hamming distance is four, so the probability of the CRC not detecting an individual independent bit error within the cell is $$\left(\frac{{}^B C_3}{4}\right)$$

where B is the number of bits in a cell. The probability of failing to detect independent bit errors is $$\left(\frac{{}^{B}C_{3}}{4}\right)P_{I}^{4} \approx 2.3 \times 10^{-26}$$

This value is negligible, nevertheless from Simmons et al the probability of the 10 bit CRC failing to detect a burst error is $2^{-10}$. Therefore the probability of an undetected burst error happening is: $P_B \times 2^{-10} = 9 \times 10^{-11}$. The cell's 10 bit CRC does not perform well or meet the undetected error threshold. To prevent an increase in the size of the cell it is more beneficial to add extra redundancy to the frame using an x-bit CRC, see FIG. 2. To achieve the goal x must satisfy: $P_B \times 2^{-10} \times 2^{-x} \leq 10^{-21}$ which gives $$\chi = \left\lceil \frac{-21 + \log(P_B \times 2^{10})}{\log 2} \right\rceil = 37$$

Therefore a minimum of a 37 bit CRC code is required for the frame, as shown in FIG. 4.

Cell Loss:

Without considering Single Segment Messages, lost cells will be detected by the cell sequence numbering (SN) field. The probability of the next cell incorrectly containing the anticipated cell sequence number is 1/16, for a 4 bit SN field. For this to happen at least 15 consecutive cells would have to be lost, a probability of $10^{-75}$.

Suppose an End of Message and Beginning of Message were lost then a cell's 4-bit sequence number would detect the lost cells with a probability of $2^{-4}$. A frame's B-tag, E-tag and Length Indicator would then detect the corrupt frame. Assuming a worst case of a completely random B-tag and E-tag then the total probability of a lost cell being detected is $2^{-28} = 4 \times 10^{-9}$ giving a total probability of $4 \times 10^{-15}$. To reduce this to the reference value, the 37 bit CRC suggested above could be used, which would reduce it to $3 \times 10^{-26}$.

Single Segment Messages will always miss detection when lost and are not considered here.

Misdirected Cells:

Obviously a misdirected cell will cause two errors; the original destination will observe a cell loss, as discussed, and the unintended destination will experience cell gain. Following a single cell gain, detection by a cell's Sequence Number (SN) field will fail if it contains the correct next SN and the segment type field contains an End of Message segment type. End of Message cells could cause a valid early termination of the frame. Continuation of Message and Beginning of Message cells will always be detected by the frame's SN field.

The frame's 8 bit E-tag field will fail to detect an incorrect End of Message if it has the same value as the original Beginning of Message cell's B-tag field. The 16 bit Length Indicator field will also have to repressent the correct length for the corrupt message. The total probability of AAL ¾ failing to detect cell gain for non Single Segment Messages is $2^{-28} = 3.7 \times 10^{-9}$. The total probability of a misinserted cell is $P_{MD} \times 3.7 \times 10^{-9} = 1.1 \times 10^{-18}$ and fails to reach the threshold. The CRC recommended for the frame would reduce this probability to $6 \times 10^{-30}$ which is below the threshold discussed above.

Misordered Cells:

A cell's Sequence Number (SN) circulates from 0 to 15 and can detect out of sequence cells due to random bit errors with a probability of "$19^{-1}!$" according to Simmons et al. Combining this with $P_{MO}$, the probability of a misordered cell being undetected is $8 \times 10^{-24}$ and becomes negligible.

For misordering due to dynamic routing, the probability of an undetected error is bound by using (1), where N is the frame size in cells, such that $m \leq N \leq M$, required to generate an error and k is the point at which a break may occur. The bounds of the number of possible permutations within a frame, F, that could occur at point k are as follows:

$$\frac{(N-(k-2))^k}{k!} > F_{(k)} > \frac{(N-(k-1))^k}{k!} \tag{1}$$

From (1) the probability of rerouting causing an undetected error is for the worst case bounded by (2), where N is the worst case scenario.

$$\sum_{k=\lceil \frac{m}{2} \rceil}^{\lceil \frac{N}{2} \rceil} \left[\frac{(N-(k-2))^k}{k!}\right] < 1/P_E < \sum_{k=\lceil \frac{m}{2} \rceil}^{\lceil \frac{N}{2} \rceil} \left[\frac{(N-(k-1))^k}{k!}\right] \tag{2}$$

FIG. 5 shows that N was found to be 36 and the worst case probability, $P_E$, is bounded by $4 \times 10^{-9} < P_E < 7 \times 10^{-9}$. From above, $P_{MO} = 20$ per switch and therefore a link will be subject to 40 failures within the 100 year period (2 switches per link). The 40 failures will affect all the connections over the link. With $P_E = 7 \times 10^{-9}$ then there can be no more than $(40 \times 7 \times 10^{-9})^{-1} = 3.57$ million connections over the link to remain within the defined limits. The actual value will be less than this because of link and software failures.

AAL ¾ Error Correction Performance

Applications using an unassured service require either a retransmission protocol at the higher layers, to cater for errors, or can accept errors provided the error rate is within acceptable limits. The implementation of a retransmission protocol is undesirable; it requires buffering of the original message at the transmitter until it receives an acknowledgement for the data transfer. Providing a sufficiently low error rate for these services is the most efficient option.

From the network performance metrics it can be seen that the most common error event per cell is $P_I$. Using error correction at the cell sublayer could reduce the probability of independent random bit errors causing an error to the probability of there being two independent random bit errors per cell. This gives a probability of not being able to correct the error as $8 \times 10^{-12}$. To achieve this a 9 bit Hamming error correction code is proposed in place of the 10 bit cell CRC. Using the cell to generate the error correction instead of the error detection means that no extra overhead is incurred.

Obviously reducing the error detection performance of the cell redundancy code will affect the overall error detection probability. It was shown that burst errors are the most prominent undetected error that rely on the cell CRC as well as the frame CRC. In order to maintain the required error performance the proposed frame CRC will have to be 38 bits, maintaining the undetected error rate at $6 \times 10^{-22}$.

It is envisaged that the error correction could be optional, so that a user can specify that it is not to be used if the application is not sensitve to errors, and a reduction in the amount of processing is desirable at the transmitting end or the receiving end or both.

Further Performance Increases

Implementing the Hamming redundancy code provides one spare bit. This spare bit can be used to improve significantly the performance of the Sequence Number (SN) by increasing it to 5 bits. A 5 bit SN field has a worst case error when N=68 (see FIG. 6) and gives the undetected error probability bounds of $5\times10^{-17}<P_E<9\times10^{-17}$. The significance of this can be seen by comparing the number of connections that can exist over a link but still remain within our limits. With the 4 bit SN no more than 3.57 million connections could exist over a link to ensure that our limits are met. A 5 bit SN allows this value to increase to $2.7\times10^{14}$ possible connections which gives plenty of room for error in the MTBF failure predictions.

Conclusions and Implementation

Using error detection, the effect of bit errors can be significantly reduced and the effect of cell loss becomes the dominating factor. Cell loss can be controlled and has been specified as $10^{-6}$. However if this was controlled to $<9\times10^{-8}$ then burst errors would become the dominating factor which could not be controlled. This may require increased buffering in switches, though the proportional increase will be small since such switches will already contain a large amount of buffering. Therefore by implementing this protocol and applying tighter constraints to cell loss the probability of an uncorrectable error would be reduced to $9\times10^{-8}$, i.e. almost a 50-fold improvement of the current protocol. Thus AALs such as AAL ¾ can be significantly improved with minimal alteration to the existing protocol structure.

A schematic diagram of the principal steps in an embodiment of a data transmission method of the invention is shown in FIG. 7. The method can be implemented on conventional hardware the transmitting side and at the receiving side. Error detection and error correction can be implemented either in software or in dedicated hardware if more speed is desired. The transmission of the cells across the link may be carried out by any appropriate physical layer hardware, such as a SONET/SDH link.

The error processing means may be implemented in software at layer 3 or higher of the ISO reference model. It may be operable to request retransmission, or merely to monitor and log errors to enable independent verification of error rates, for guaranteed levels of service.

The error detection can be implemented at higher levels, above the frame level, which for ATM at least is regarded as being within layer 2 of the ISO reference model. Advantageously the error detection should be made sufficient to reduce the likelihood of an undetected error to negligible levels. Advantageously the error correction should be sufficient to correct any one bit error in a cell or to achieve an uncorrectable error rate of $<9\times10^{-8}$.

Clearly the features of the invention can be applied to a wide range of cell-based transmission protocols. Other variations may be envisaged which will fall within the scope of the claims.

We claim:

1. A method of transmitting data from an application, comprising the steps of:
   supplementing the data with error detection information;
   forming the supplemented data into at least one ATM cell, the cell comprising cell routing information and a cell payload and wherein the cell payload comprises at least a portion of the supplemented data and comprises error correction information
   for the portion depending on the application;
   transmitting the cell to a destination; correcting an error in the cell using said error correction information depending on the application;
   extracting the portion of the supplemented data from the cell; and detecting uncorrected errors in the data using said error detection information and reporting the uncorrected errors to an error processing means.

2. The method of claim 1 wherein the supplemented data is formed into at least one frame, and wherein the error detection information for each frame is determined for the data in that frame.

3. The method of claim 1 wherein the cell transmission is by a connection oriented method.

4. The method of claim 1 wherein before transmission a desired bandwidth request, or tolerable maximum error rate request or other quality of service request for the transmission, is sent to the link.

5. The method of claim 1 wherein the error processing means is operable to request retransmission of some or all of the data if an uncorrected error is detected.

6. The method of claim 1 wherein the cell transmission step is carried out by an ATM protocol.

7. The method of claim 1, wherein the cell transmission step is carried out by an ATM protocol, wherein the supplemented data is formed into at least one frame suitable for use with an ATM adaption layer, and wherein the error detection information for each frame is determined for the data in that frame.

8. The method of claim 1 wherein the cells comprise a sequence number of 5 bits or more, indicating the order of a given cell in a given frame.

9. The method of claim 1 wherein the error correction information comprises a Hamming error correction code.

10. The method of claim 9 wherein the Hamming code is 9 bits long.

11. The method of claim 1 wherein the error detection information comprises a cyclic redundancy check code.

12. The method of claim 11 wherein the check code is 37 or 38 bits long.

13. A method of transmitting data comprising the steps of:
   forming the data into at least one frame, the frame also comprising error detection information relating to the data in that frame, sufficient to achieve an undetected bit error rate of substantially $10^{-21}$;
   forming each frame into at least one cell, the cell comprising cell routing information and a cell payload, the payload comprising at least a portion of the frame;
   transmitting the cell to a destination;
   extracting the frame from the cell; and
   detecting errors in the frame from the error detection information for that frame, and reporting them to an error processing means.

14. A system for transmitting data from an application across a link and comprising:
   means for supplementing the data with error detection information;
   means for forming the supplemented data into at least one ATM cell, the cell comprising cell routing information and a cell payload and wherein the cell payload comprises at least a portion of the supplemented data and comprising error
   correction information for the portion, dependent on the application;
   means for transmitting the cell to a destination;
   means for correcting an error in the cell using said error correction information dependent on the application;
   means for extracting the portion of the supplemented data from the cell; and
   means for detecting uncorrected errors in the data using said error detection information and reporting the uncorrected errors.

* * * * *